United States Patent [19]

Tector et al.

[11] 4,225,052
[45] Sep. 30, 1980

[54] INSULATED FOOD CONTAINER

[76] Inventors: Nancie Tector, 850 W. Margate, Apt. 301; John V. Curley, 5016 Sheridan Rd., both of Chicago, Ill. 60640

[21] Appl. No.: 757,445

[22] Filed: Jan. 6, 1977

[51] Int. Cl.³ .................... B65D 1/24; B65D 25/28
[52] U.S. Cl. ............................ 220/22; 220/94 R; 220/23.8
[58] Field of Search .............. 220/22, 21, 23.8, 94 R, 220/DIG. 10

[56] References Cited

U.S. PATENT DOCUMENTS

| | | | |
|---|---|---|---|
| 1,426,211 | 8/1922 | Pausin | 220/94 R |
| 2,096,825 | 10/1937 | Roman | 220/23.8 X |
| 2,641,912 | 6/1953 | Lawler | 220/23.8 |
| 2,658,643 | 11/1953 | Miller et al. | 220/22 |
| 3,799,386 | 3/1974 | Madalin et al. | 220/23.8 X |

*Primary Examiner*—Steven M. Pollard
*Attorney, Agent, or Firm*—Robert E. Browne

[57] ABSTRACT

A food container for the transport of a hot prepared meal having a dish or tray portion and a cover, both of which are insulated and engageable to form a seal which retains the flavor and warmth of the food within. The cover has a handle which may be laid flat to allow a like container to rest on it in a stable manner. The dish portion has a plurality of sections, one of which may contain a cup for beverages.

3 Claims, 4 Drawing Figures

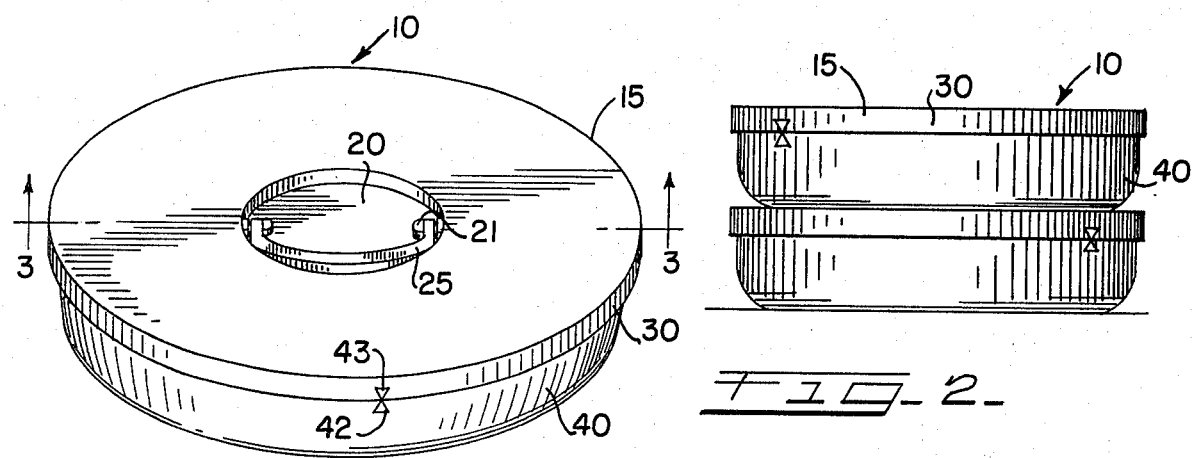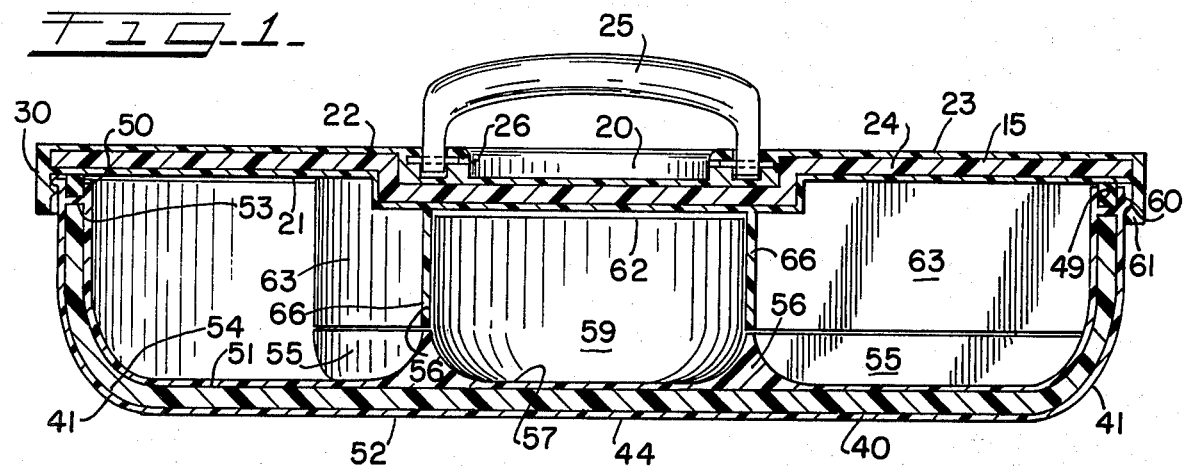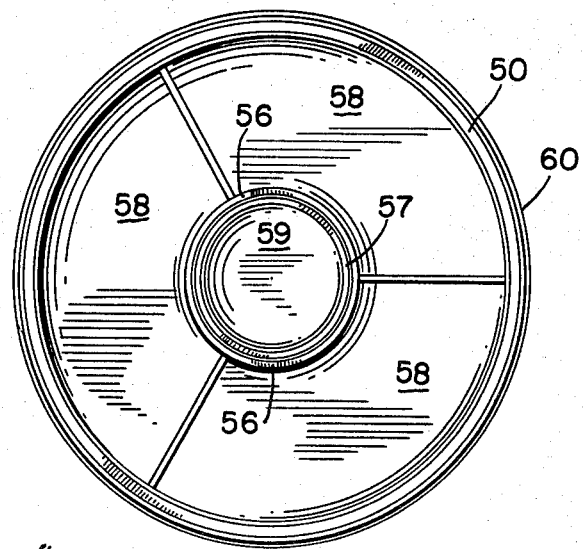

INSULATED FOOD CONTAINER

BACKGROUND OF THE INVENTION

The present invention relates to an implement for the transport and dispensing of food, and more particularly, to a covered dish which serves as a delivery container and food plate for individual meals.

In institutional settings a prerequisite to the serving of food is that the food be kept hot and flavorful for serving to the patient or other inmate of the institution. The utensils used must be easily cleanable and lend themselves to easy use by the weak and infirmed. Further, the container should be stackable and a person should be able to carry a number of containers simultaneously so that a quick and efficient dispensing of the food is possible.

In general, institutions have used the standard plate coupled with a moveable metal cover in order to retain the heat and flavor of the food while affording stackability of the container. While the metal cover had the advantages of strength to allow the stacking of food containers and was easily cleanable, it would not retain the heat and flavor of the food over a long period of time due to its incomplete sealing of the plate and the natural thermal conductivity associated with metals. Furthermore, with this arrangement, beverages had to be served separately thereby occasioning a loss of efficiency.

More importantly, no satisfactory means is available which will allow an individual such as a worker or visiting nurse to prepare a hot meal in advance and carry it from the place of preparation to a distant location such as a job site or home, or any other setting where a complete hot meal is not conveniently available and have it available for consumption there, at a much later time. It is obvious that the standard institutional approach can not function in other than an institutional setting; a plate with a metal cover loosely positioned over it will not keep food appetizing outdoors for more than a few minutes. There is no protection from the elements at all. Using presently available products, an individual must use a multitude of separate insulated containers to carry a full meal to, say, an infirmed person who resides some distance away.

Containers have been developed which specifically retain the desired temperature of food but these are difficult to clean or eat out of, or both. Some of these containers included a standard plate with a cover thereon to retain the warmth and flavor of the food while also retaining the easy cleaning characteristics of the plate. However, such devices simply provide extra dishes to clean while allowing different foods to come in contact with one another when the container is transported any distance.

SUMMARY OF THE INVENTION

It is therefore an object of the subject invention to provide a food container for the transport of prepared foods while retaining a desired temperature and flavor of the food in transport.

Another object of the subject invention is to provide for a lightweight compartmentalized food container with sufficient strength to allow stability in stacking when carrying hot prepared foods.

A further object of the subject invention is to provide a simply constructed, easily cleaned container capable of holding food and beverage.

Still another object of this invention is to provide a portable food container having a plurality of food and beverage containing compartments to separate food items.

These and other objects are attained in accordance with the present invention wherein there is provided a container or tray for the transport and holding of hot prepared foods over a relatively long period of time while retaining the heat and flavor necessary to keep that food in an appetizing condition. The food tray container of the subject invention comprises a tray or dish portion and a lid or cover. Both cover and dish are of multi-layer construction with an inner layer of insulation material sandwiched between two outer layers of high-impact plastic. The cover has a hinged handle located in a recess within its top surface thereby allowing the handle to lay flat and permitting other similar containers to be stably placed or stacked in a stable vertical arrangement on the cover. Thus, a number of such food plate containers may be easily and safely transported in a minimum of space. The tray or dish portion of the container is partitioned into a plurality of sections, each section separating the different foodstuffs from one another. In the interior of the container body is a circular section into which a cup for liquids will fit comfortably. The cover and the dish portion are releasably fastened to one another by threads, bayonet-type slots or similar means to effectively seal the contents of the container from the ambient air, thereby preserving heat and flavor. With the cover on tight, the user may grasp the handle for carrying without fear of loss or spillage of the food within.

The insulating characteristics of this food container allows a hot meal to be prepared, transported and subsequently consumed without detrimental loss of heat and without mess.

DESCRIPTION OF THE DRAWINGS

Further objects of the subject invention, together with additional features contributing thereto and advantages accuring therefrom will be apparent from the following description of one embodiment of the invention when read in conjunction with the accompanying drawings wherein:

FIG. 1 shows a perspective view of the food container of the subject invention;

FIG. 2 shows a side view of food containers according to the invention stacked on top of one another;

FIG. 3 shows a cross-sectional view, taken along line 3—3 of FIG. 1, showing the multi-layer construction of the food container of the subject invention; and, FIG. 4 shows a top plan view of the dish portion of the food container of the subject invention.

DESCRIPTION OF THE INVENTION

Referring now to FIG. 1, there is shown a prepared food container 10 having a generally circular cover 15 and a container body or dish portion 40. The cover 15 has a downwardly extending flange 30 about its periphery. On the top surface 23 of the cover 15 is recessed area 20. A handle 25 having a thickness slightly less than the depth of recess 20 is pivotally mounted on molded arms 21 extending into recess 20 so that no portion of the handle 25 extends outside the recess when laying flat, and the handle 25 is easily grasped when pivoted to an upright position.

The dish portion 40 has an outside wall 52 preferably formed of a high-impact plastic such as high-impact polyethylene or polystyrene, and an inside wall 51 formed of the same material. Sandwiched between the inside wall 51 and the outside wall 52 is a layer of insulating material 54, such as expanded polystyrene or polyurethane (FIG. 3). The cover 15 is formed in a similar fashion having an inside wall 21 and an outside wall 22 sandwiching the insulating layer 24.

The downwardly extending flange 30 of the cover 15 is threaded at 61 on the interior face of flange 30 to mate with a similar thread 60 on the upper edge of the outside wall 52. A resilient sealing ring 50 may be fitted into a channelshaped seat 49 formed between the inside wall 51 and the outside wall 52 of the dish portion 40 to provide a thermallytight seal between the cover 15 and the dish portion 40. The sealing ring 50 extends slightly above the upper edge of the inside and outside walls 51 and 52 to assure a tight seal and provide a cushion affect. Thus, when the cover 15 is placed on the dish portion 40, the cover 15 is rotated to initially engage the cover thread 61 with the body thread 60 and further rotated until the seal 50 is engaged and forced down into its supporting seat 49. This causes the mating threads 60 and 61 to tightly engage one another and seal 50 to tightly engage the inside wall 21 of the cover 15. When rotation of the cover upon the dish portion 40 becomes difficult, the frictional engagement of the cover with the body is sufficient to enable the entire container to be carried by its handle 25 without fear of disengagement of the cover from the dish portion. This engagement also effectively seals the interior of the container from the surroundings to prevent thermal and fluid leakage or loss. Of course, any other suitable means of sealing the cover interface with the dish portion may be used.

The dish portion of the food container, while having rounded corners 41, has a substantially flat base or bottom 44. Thus, the container, as a whole, is extremely stable and will not tip. The top surface 23 of the cover 15 is also substantially flat, thereby providing a base for stacking a similar container insuring the stability of both containers when stacked on top of one another, as shown in FIG. 2. In this manner, two or more of these containers 10, may be stacked and carried, either in hand, or on a car seat or the like, without worry of dropping and spilling the contents within the container 10.

The interior of the dish portion 40 is divided into separate food sections 58 as shown in FIG. 4, by lower radially extending interior partitions 55 which extend vertically only a fraction of the height of the dish portion 40. Partitions 55 should be sufficiently high to prevent food in adjacent sections from mixing but not so high as to interfere with the process of cutting meat or other food items. A height of 0.25 to 0.50 inches would be desirable. While the interior area of the dish portion 40 may be partitioned in any manner desirable, it is anticipated that a separate circular section 57 be formed by circular partition 56 concentric with the center point of dish 40. Section 57 is formed to hold a container cup 59 to hold beverage. The cup 59 could be independently sealed at its top to prevent spillage and is supported by the circular partition 56, thereby preventing its movement within the container 10. The cup could also be sealed by a resilient pad secured to the inside surface of cover 15 and positioned over section 57 holding cup 59. Various types of foods may be placed in each section 58. The partitions 55 serve the dual purpose of retaining these foods and their juices within each section 58, while at the same time being low enough to allow cutting and eating to be accomplished comfortably. The inclusion of the cup 59 allows a complete meal including beverage to be carried within one container. Each section 58 is preferably formed with radiused corners to facilitate eating and cleaning.

The cover portion 15 preferably includes a plurality of downwardly directed radially extending upper partitions 63 and an upper circular partition 66, each of which extend vertically downward a distance sufficient to complement the height of lower partitions 55 and 56. Thus, when the cover 15 is placed tightly on the dish portion 40 in the proper position, partitions 55 and 63 and 56 and 66 will effectively form a plurality of separate enclosed compartments within the container and inhibit the escape of the contents of one compartment to the adjoining compartment. In this manner, when the container is tilted, little or no mixing of the contents within the container will result. The proper positioning of these complementary partitions to achieve this result may be accomplished through the use of matching indicia, such as the arrows 42 and 43, on the cover periphery 30 and outside wall 52 of the dish portion 40 as shown in FIG. 1. When the cover portion 15 is secured to the dish portion 40, care is taken to line up these indicia 42 and 43, thereby lining up the cover interior partitions 63 with the dish interior partitions 55 so that the respective interior wall partitions complement one another to form the individual compartments upon tight closure of the container. It is noted that it is not intended or desired that partitions 55 and 63 and 56 and 66 contact one another when the container is assembled, since it is not necessary that this invention be constructed to such exacting tolerances to provide the desired result.

While the invention has been particularly described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefor, it is intended that the invention not be limited to the particular embodiment disclosed as the best mode contemplated for carrying out this invention, but that the invention will include all embodiments falling within the scope of the appended claims.

I claim:

1. A portable insulated container for the temporary transportation and storage of foods desired to be maintained at a certain temperature, including a dish portion and a cover portion, said cover portion being threadedly secured to said dish portion in a fluid-tight manner, said dish portion having a generally upstanding exterior side wall, a substantially flat exterior bottom wall and a plurality of sections for the containment and separation of different foods or beverages within the interior thereof, said sections being formed by a central circular partition and a series of angularly spaced food partitions extending radially from said central partition toward said side wall, said circular partition and said food partitions extending upwardly, said cover portion having a plurality of partitions extending downwardly from an inside surface thereof, said downwardly extending partitions corresponding in arrangement and location to said upwardly extending partitions of said dish portion, said cover portion and said dish portion each containing indicating means alignable when said cover portion is threadedly secured to said dish portion to form a fluid-tight seal to thereby place said upwardly extending food partitions and said cover partitions in complementary positions to form said compartments within said container for holding said foods and beverages and maintaining the integrity of the foods and beverages in each of said compartments, said cover portion having a handle, said handle being centrally located in a recess formed in an outside top surface of said cover portion, said handle being pivotal from a flat position within said recess to an upright position for carrying said containers to allow the transport of said container carrying said food and said beverages by said handle while sealing the heat and flavor of said foods within said container.

2. The portable container of claim 1 wherein a cup for beverages is disposed within one of said sections of said dish portion, said cup being securely held within said container when said dish portion is joined to said cover portion.

3. The portable container of claim 1 wherein a resilient sealing means is disposed about a periphery of said dish portion of said container and between said cover portion and said dish portion of said container, when joined to one another, to fluid-tightly seal the interior of said container.

* * * * *